Oct. 14, 1958  D. R. RYAN  2,856,085
FREIGHT TRANSFER APPARATUS
Filed Feb. 1, 1956  3 Sheets-Sheet 1

INVENTOR:
DANIEL R. RYAN
BY
ATT'Y

Oct. 14, 1958  D. R. RYAN  2,856,085
FREIGHT TRANSFER APPARATUS
Filed Feb. 1, 1956  3 Sheets-Sheet 2
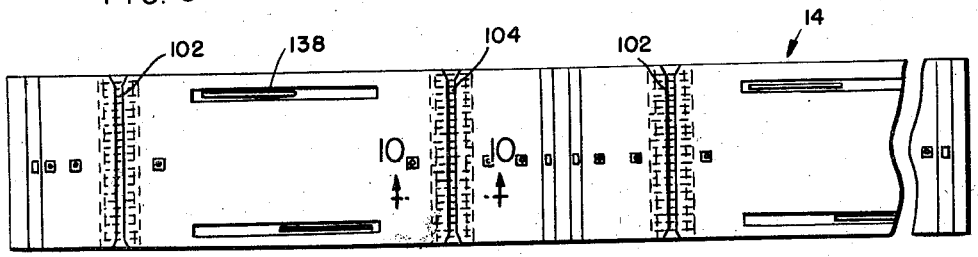
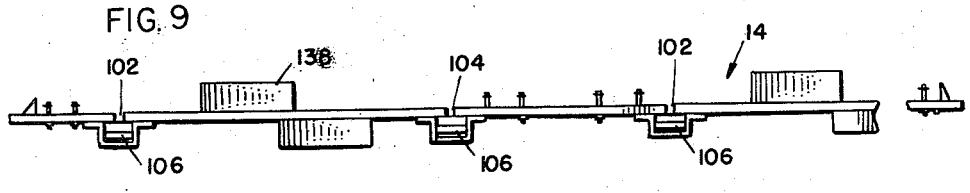
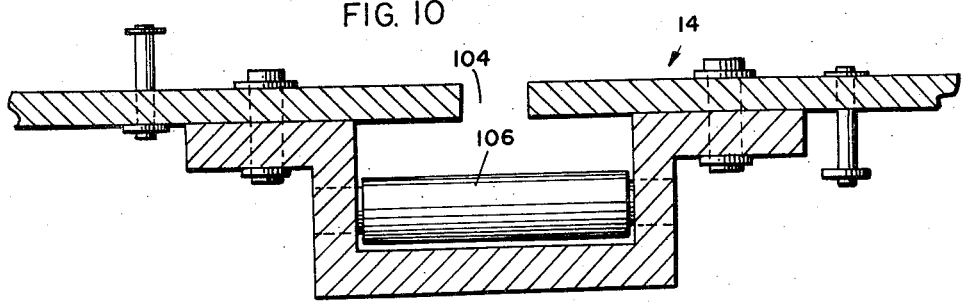
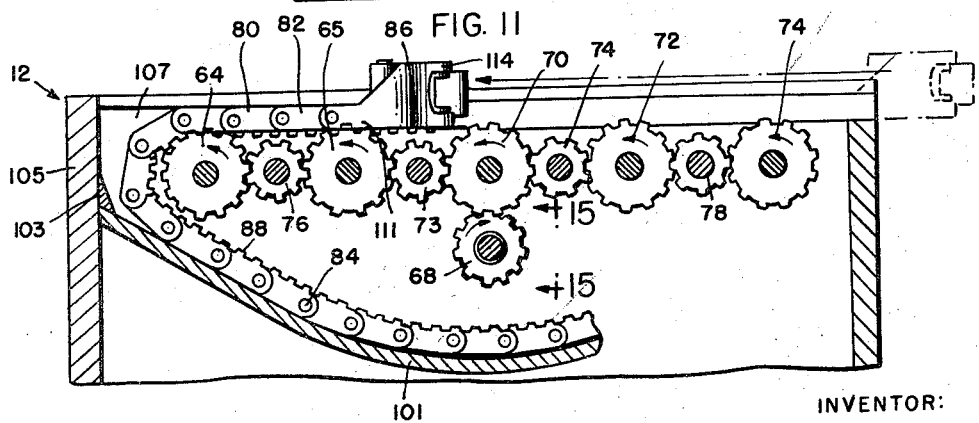
INVENTOR:
DANIEL R. RYAN
BY
ATT'Y Oct. 14, 1958     D. R. RYAN     2,856,085
FREIGHT TRANSFER APPARATUS
Filed Feb. 1, 1956     3 Sheets-Sheet 3
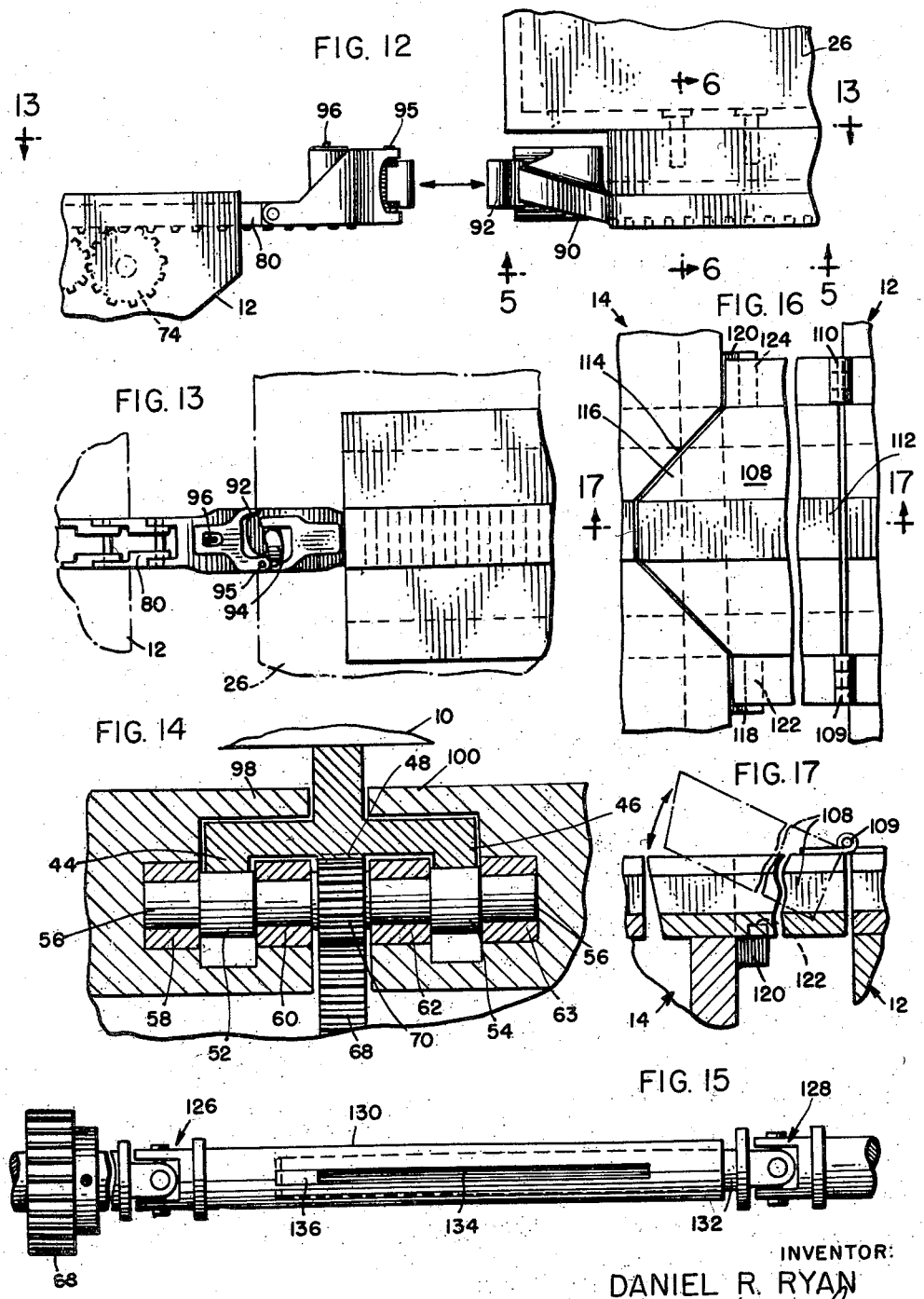
INVENTOR:
DANIEL R. RYAN
BY
ATT'Y United States Patent Office 2,856,085
Patented Oct. 14, 1958

2,856,085

FREIGHT TRANSFER APPARATUS

Daniel R. Ryan, Flossmoor, Ill.

Application February 1, 1956, Serial No. 562,834

9 Claims. (Cl. 214—38)

This invention relates to freight transfer apparatus, and more particularly to equipment for moving demountable freight containers for less than car load lots from the trailer bed of a trailer truck or the like to a flat car or from a flat car to a trailer bed with a minimum of friction and with positive control of the container throughout the transfer process.

Currently available forms of "piggy-back" transportation present various mechanical problems which reduce their competitive advantage over through trucking. For example, many types of demountable freight containers are provided with wheels for effecting the transfer from truck to train or vice-versa, so that the center of balance of the container is higher than is desirable and it is difficult to lock the container to the given vehicle. Another objection to L—C—L (less than carload lot) shipping is that the means for pushing and pulling the containers from one working surface to another are overly complex and subject to breakdown, since they generally involve the use of winches, cranes or endless belt systems. Furthermore, such means do not afford steady and accurate positive control of the container at all stages of transfer. It has also been difficult to maintain the flat car and trailer bed in proper alignment with one another, which is necessary where guide means are employed on the flat car and trailer bed respectively, as is often done.

It is, accordingly, an object of the present invention to provide freight transfer apparatus in which guides of an inverted T-shaped configuration are disposed transversely along the bottom of a freight container in parallel spaced relationship and complementary guideways are formed in the trailer bed of a trailer truck and in a flat car respectively, with a plurality of rollers journalled therein, for rollingly supporting the container during transfer.

Another object of the invention is the provision of a rack extending axially along each guide and gear train means in each of said guideways in said trailer bed for moving said container across said trailer bed, said guides each having a track extending downwardly on either side of the rack and said rollers being disposed on either side of said gear train means and adapted to engage with said tracks.

Another object of the invention is to provide a gear chain adapted to mesh with said gear train means and having a coupler head adapted to releasably engage a corresponding coupler head on said container for exerting positive push-pull control on said container at all positions thereof and during movement across said flat car.

Another object is the provision of a bridge for connecting the trailer bed and flat car of the invention, which is pivotally fastened to the trailer bed in axial alignment with each of the guideways and has a guideway extending therethrough corresponding to the guideways in the trailer bed and flat car respectively, as well as fastening means on the flat car and bridge which maintain the guideways in proper alignment.

Another object of the invetnion is the provision of flared openings for the guideways on the trailer bed and flat car respectively for directing the guides as they are introduced therein.

Another object of the invention is to provide an adjustable drive-shaft for the gear train means of the invention which will permit torque to be transmitted from the power plant of the truck to the respective gear trains when the trailer bed is raised or lowered by standard hydraulic jack means to place the working surfaces of the flat car and trailer bed in substantially coplaner registration.

Other objects and advantages will become apparent as the description proceeds in accordance with the drawings, in which:

Fig. 8 is a top plan view of a flat car according to the invention;

Fig. 9 is a side elevational view of the flat car of the invention;

Fig. 10 is an enlarged vertical sectional view, partly broken away, taken along the lines 10—10 of Fig. 8.

Fig. 11 is a vertical sectional view taken along the lines 11—11 of Fig. 4;

Fig. 12 is a side elevational view partly broken away of coupler for a gear chain according to the invention and of the coupler for the freight container adapted to cooperate therewith;

Fig. 13 is a top plan view taken along the line 13—13 of Fig. 12 but showing the coupler means in interlocking relationship;

Fig. 14 is a vertical sectional view of the trailer and box with the guide means in connected relationship;

Fig. 15 is a top plan view of an adjustable drive shaft for the gear means of the invention, taken along lines 15—15 of Fig. 11;

Fig. 16 is a top plan view of the bridge connection for the freight car and the truck body taken along the lines 16—16 of Fig. 1; and Fig. 17 is a vertical sectional view of the bridge means taken along the lines 17—17 in Fig. 16.

Figure 1:
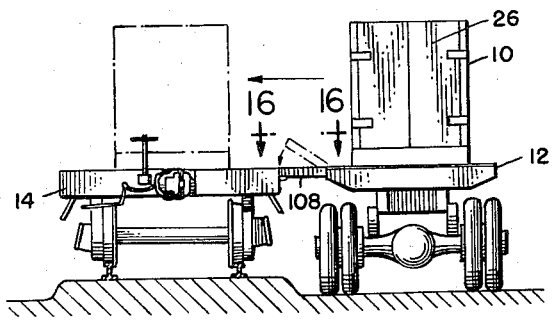
Fig. 1 is an end view of a flat car and truck in position for transfer of the demountable freight container of the invention from the truck to the flat car.
Figure 5:
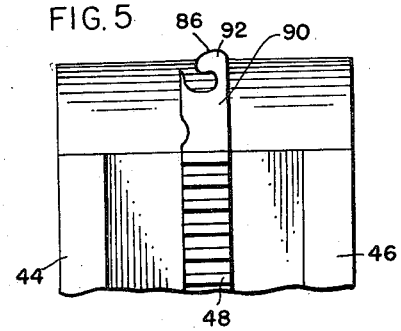
Fig. 5 is a bottom plan view, partly broken away, of a coupler for the freight container, taken along the lines 5—5 of Figs. 6 and 12.
Figure 2:
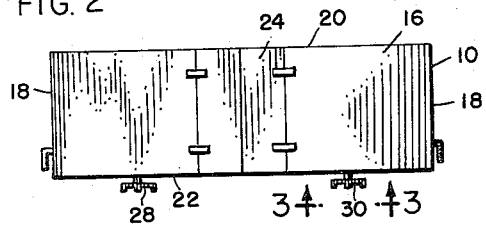
Fig. 2 is a side elevational view of the demountable freight container of the invention.
Figure 6:
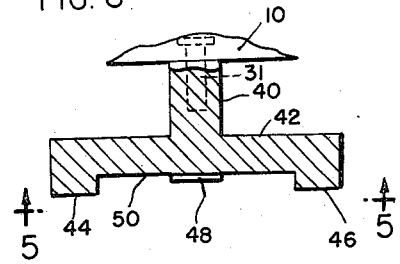
Fig. 6 is an enlarged fragmentary view of a guide and support for the container taken along the lines 6—6 of Fig. 12.
Figure 3:
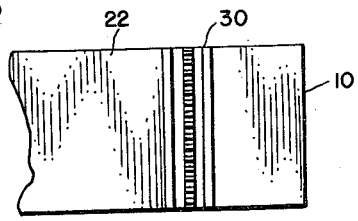
Fig. 3 is a bottom plan view, partly broken away, of the freight container of the invention taken along the lines 3—3 of Fig. 2.
Figure 7:
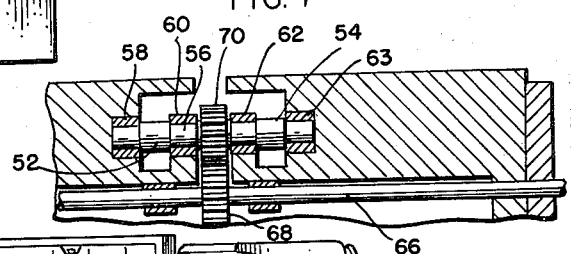
Fig. 7 is a vertical sectional view taken through the trailer bed on the lines 7—7 of Fig. 4.
Figure 4:
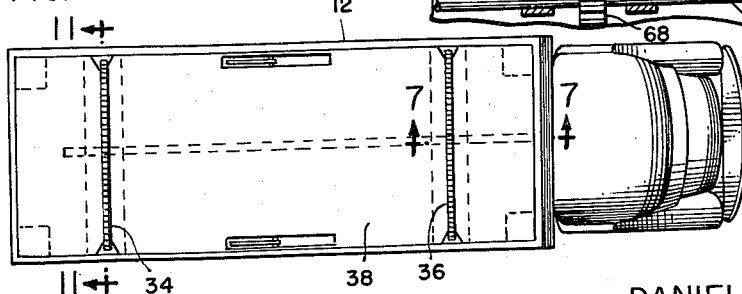
Fig. 4 is a top plan view of a truck body and trailer bed according to the invention showing the guideways for the demountable container.

Referring to Figs. 1, 2 and 3, a demountable freight container 10 is provided for transporting less than carload lots on a trailer truck 12 or a flat car 14, the truck and flat car being of conventional construction except as hereinafter set forth. The container 10 has side walls 16, end walls 18, a top wall 20 and a bottom wall 22, and it is preferred that the side walls and end walls have doors 24 and 26 respectively.

A pair of guides 28 and 30 are fastened in parallel spaced apart relationship to the bottom 22 of the container 10 transversely thereof, by bolts 31 or other suitable means, and are adapted to be received in mating engagement within a pair of guideways 34 and 36 which are formed in the trailer bed 38 of the truck 12 as shown in Figs. 4, 7, 11 and 14. Each of the guides 28 and 30 is of an inverted T-shape in cross-sectional configuration and comprises a depending pedestal 40 having a cross-piece 42, depending tracks 44 and 46 at each edge of the cross bar 42 and a gear rack 48 extending centrally in the recessed portion 50 of the cross bar. The tracks 44 and 46 are rollingly supported on rollers, such as rollers 52 and 54 of Fig. 7, rotatably mounted on shafts such as shaft 56 which are journalled in bearings corresponding to bearings 58, 60, 62 and 63.

In order to move the container 10 along the guideways 34 and 36, a drive shaft 65 is provided which is adapted to be reversibly driven by the power plant of the truck and suitable clutch means (not shown) and which has a gear 68 adapted to mesh with a gear 70 on shaft 56 between rollers 52 and 54. A plurality of gears 64, 65, 72 and 74 are adapted to be driven in the same direction of angular rotation as gear 70 by means of spur gears 73 and 74 which engage with gear 70 and gears 66 and 74 respectively and spur gears 76 and 78 which engage with gears 64 and 66 and gears 72 and 74 respectively. The gears 64—74 extend upwardly into the recessed or offset portion 50 between tracks 44 and 46 to engage with rack 48 in meshing relationship when the tracks engage the rollers as shown in Fig. 14, so that the rack 48 is actuated in the direction of rotation of these gears at a plurality of points to afford even, continuous power regardless of the position of the container in the guideway.

Referring to Fig. 11, a gear chain 80 is disposed in meshing engagement with one or more of the gears 64—74 for the purpose of controlling the movement of the container 10 even beyond the guideways 34 and 36, as will be hereinafter further explained. The chain is formed of a plurality of links 82 joined together somewhat stiffly by means of link-bars 84 and has a coupler 86 at one end thereof, the links 82 and coupler 86 engaging the gears 64—74 by means of depending teeth 88. A coupler 90 is rigidly mounted on each end of each of the guides 28 and 30 for releasably locking with the coupler 86, having a jaw 92 formed integrally therewith, and a jaw 94 is pivotally secured in the coupler 86 by means of a pin 95. The jaw 94 extends rearwardly into a horizontal recess in the coupler (not shown) and when the jaw 94 is pivoted outwardly, movement of the coupler 86 into proximate relation with coupler 90 will bring the jaw 92 past the jaw 94 without contact therebetween and thereupon will cause the jaw 94 to pivot into locking engagement with jaw 92 by means of camming action exerted by jaw 92 on the rear extension of jaw 94. This movement of the rear extension will also permit a lock pin 96 to slide downwardly in coupler 86 so as to prevent the rear extension from movement in the opposite direction, and to maintain the locking engagement of jaws 92 and 94. When the lock pin 96 is lifted by a suitable hook (not shown), the jaw 94 is free to pivot out of engagement with jaw 92 upon application of tension force thereto.

Both of the couplers 86 and 90 are shaped to ride freely above opposed flanges 98 and 100 of the guideways 34 and 36, and the links 82 are restrained from buckling by these flanges so that the chain 80 can exert horizontal force in pushing the container. When the chain 80 is in retracted or semi-retracted position, it can be stored to the extent needed upon a cradle structure 101 secured by brackets 103 to the sidewalls 105 of the trailer bed, an aperture 107 being formed at an end of each of the guideways to receive the chain. The gear 64 is spaced from wall 105 a sufficient distance to permit the links to pass downwardly through the aperture without engaging the gear while at an incline from the horizontal, so that no jamming will occur; and the link 111 formed integrally with coupler 86 is of a length to come into abutment with wall 105 when the chain is moved rearwardly into the cradle so as to provide a stop which will maintain the chain in operative position.

The flat car 14 is provided with guideways such as guideways 102 and 104, having an inverted T-shape corresponding to guideways 34 and 36, with a plurality of rollers 106 journalled therein for receiving the guides 28 and 30 as the container 10 is transferred from the trailer bed 38 to the flat car; and in order to span the gap between the trailer bed and the flat car, a bridge 108 is pivotally secured to the trailer bed by means of hinges 109 and 110, in axial alignment with each of the guideways 34 and 36. A guideway 112 of inverse-T-shaped configuration is formed in the bridge 108 to create an extension of the guideway in the trailer bed aligned therewith. The flat car 14 has a flared recess 114 adapted to receive a complementary triangular tongue 116 on the bridge 108, and a pair of brackets 118 and 120 are secured on either side of each of the guideways 102 and 104 in the flat car for locking engagement with recesses 122 and 124 in the bridge, whereby the guideways 34 and 36 of the trailer bed will be maintained in perfect registration with the guideways 102 and 104 of the flat car when the bridge is in the position shown in solid line in Figs. 1, 16 and 17. Accordingly, the guides 28 and 30 can move across a continuous path from trailer bed to flat car. Moreover, the chain 80 can control the movement of the container 10 at each position of transfer, without the necessity for separate lifting means, winches, or the like.

It will often be necessary to adjust the height of the trailer bed 38 relative to the flat car 14 to bring the two working surfaces into substantially coplaner relationship, by means of standard hydraulic jacks (not shown). To make such an adjustment possible, the drive shaft is formed to afford vertical adjustability thereof, by means of universal joints 126 and 128 fixedly secured to a tubular portion 130 of the shaft and to a rod 132 telescopically received therein, respectively. The drive shaft portions 130 and 132 are held against relative rotation by means of an axial slot 134 in sleeve 130 slidably receiving a lug 136 on rod 132, so that the full torque of the drive shaft is transmitted to gear 68.

Various means may be employed to hold the container 10 against transverse movement when it is on the flat car 14, as seen in dot-and-dash in Fig. 1, and it is preferred that flip-flop members 138 be employed which can be pivoted into raised, holding position and secured by standard means (not shown) or released into lowered position as desired.

Since the guideways themselves serve to hold the container 10 securely, a more positive positioning of the container on the car is had than has been heretofore available. The movement of the box from the freight car to the truck or vice versa may be halted at any time and begun again as desired, and the same amount of force can be applied at the flat car as on the trailer. The movement of the container in the guideways will be relatively frictionless due to the provision of the rollers described and there is no likelihood of accidental breakdown such as occurs where winches, endless chain belts, cranes or the like are used, and the operative parts themselves are disposed in a protected position where they are not likely to be damaged.

Because the bridge connection between flat car and trailer bed ensures a straight pathway for the container during transfer, the guides will be prevented from jamming in the guideways, while the provision of flared openings for the guideways ensures that the guides will be in proper alignment initially.

Accordingly, a freight transfer mechanism has been provided which can be readily operated without the exercise of special skill, so that by simply reversing the drive shaft the container can be moved from a flat car to a trailer bed, or vice versa, as desired. The container is ready for rail shipment as soon as the coupler head 86 is disengaged from coupler head 90 and the "flip-flop" stops 138 placed in upright position on the flat car as described making the system highly competitive with the trucking industry and other transportation methods as well.

Although I have herein set forth and described my invention with reference to particular details and principles thereof, it will be understood by those skilled in the art that these principles and details may be modified in various respects without departing from the spirit and scope of the invention as set forth in the hereunto appended claims:

1. Freight transfer apparatus comprising a freight container having a plurality of transversely extending guides therebeneath, each of said guides comprising a pedestal having an inverted T-shaped configuration with a pair of parallel, spaced apart tracks and a rack intermediate thereof, said tracks extending downwardly below the level of said rack, a trailer bed having a plurality of guideways therein of inverted T-shaped configuration adapted to receive said guides therein in mating relation, a plurality of gears in each of said guideways adapted to engage with the rack on the guide for said guideway, means for reversibly actuating said gears in the same direction of angular rotation, a plurality of rollers journalled in said guideway on each side of said gears adapted to engage said tracks to support said container for axial movement along said guideways, and a gear chain for each of said guideways adapted to be engaged by said gears having a coupler head adapted to ride along said guideway, each of said guides on said container having at least one coupler head adapted to releasably engage said coupler head on said chain at an end of said guide beneath said container, the relatively narrow portion of said guideway being defined by opposed flanges adapted to maintain said chain against buckling whereby said chain can exert pushing effort on said container.

2. Freight transfer apparatus comprising a freight container having a plurality of transversely extending guides therebeneath, each of said guides comprising a pedestal having an inverted T-shaped configuration with a pair of parallel, spaced apart tracks and a rack intermediate thereof, said tracks extending downwardly below the level of said rack, a trailer bed having a plurality of guideways therein of inverted T-shaped configuration adapted to receive said guides therein in mating relation, a plurality of gears in each of said guideways adapted to engage with the rack on the guide for said guideway, means for reversibly actuating said gears in the same direction of angular rotation and a plurality of rollers journalled in said guideway on each side of said gears adapted to engage said tracks to support said container for axial movement along said guideways, a gear chain for each of said guideways adapted to be engaged by said gears having a coupler head adapted to ride above said guideway, each of said guides on said container having at least one coupler head adapted to releasably engage said coupler head on said chain at an end of said guide beneath said container, the relatively narrow portion of said guideway being defined by opposed flanges adapted to maintain said chain against buckling whereby said chain can exert pushing effort on said container, and a cradle structure formed in said trailer bed beneath each of said guideways adapted to receive the other end of said chain.

3. Freight transfer apparatus comprising a freight container having a plurality of transversely extending guides therebeneath, each of said guides having a pair of parallel, spaced apart tracks and a rack extending intermediately thereof, said tracks extending downwardly below the level of said rack, a trailer bed having a plurality of guideways transversely thereof adapted to receive said guides in mating relationship therein, a plurality of gear shafts journalled in each of said guideways, each of said gear shafts carrying a gear fixedly secured thereto for meshing engagement with one of said racks, at least one roller being rotatably mounted on each side of each of said gears on each of said gear shafts, a plurality of spur gears journalled in said guideways, each of said spur gears being disposed in meshing engagement with a pair of said first-named gears and a drive shaft and pinion thereon adapted to engage with one of said first-named gears in said guideways for driving said first-named gears in one direction of angular rotation, said drive shaft having a pair of universal joints in spaced apart relation and a sleeve and rod each connected to one of said universal joints and in telescoping relationship, whereby said shaft is vertically adjustable to permit vertical adjustment of said trailer bed.

4. Freight transfer apparatus comprising a freight container having a plurality of transversely extending guides secured therebeneath, each of said guides comprising a pedestal having an inverted T-shaped configuration with a pair of parallel, spaced apart tracks and a rack extending intermediately thereof, said tracks extending below the level of said rack, a vehicle having a plurality of guideways adapted to receive said guides therein in mating relation, roller means in said guideways adapted to support said guides and said container for movement along said guideways, gear means adapted to actuate said container for said movement, and a gear chain having a coupler head adapted to ride above each of said guideways, each of said guides on said container having at least one coupler head adapted to releasably engage said coupler head on said chain at an end of said guide beneath said container.

5. Freight transfer apparatus comprising a freight container having a plurality of transversely extending guides therebeneath, each of said guides comprising a pedestal having an inverted T-shaped configuration with a pair of parallel, spaced apart tracks and a rack intermediate thereof, said tracks extending downwardly below the level of said rack, a trailer bed having a plurality of guideways therein of inverted T-shaped configuration adapted to receive said guides therein in mating relation, a plurality of gears in each of said guideways adapted to engage with the rack on the guide for said guideway, and means for reversibly actuating said gears in the same direction of angular rotation and a plurality of rollers journalled in said guideways on each side of said gears adapted to engage said tracks to support said container for longitudinal movement along said guideways, coupler means reciprocated by said gears for each of said guideways and each of said guides on said container having at least one coupler head adapted to releasably engage said coupler means for moving the guide racks into and out of engagement with said gears.

6. Freight transfer apparatus comprising a demountable container having a plurality of transversely extending guides secured therebeneath having a track on the bottom thereof, a vehicle having a plurality of guideways adapted to receive said guides therein in mating relation, roller means in said guideways adapted to support said guides and said container for movement along said guideways, a flat car having a plurality of guideways of an inverted T-shaped configuration to receive the guides on said container therein in mating relationship, each of said guideways on said flat car having a plurality of rollers journalled therein for engaging the track on the guides to support said container for longitudinal movement in said guideways, a gear chain and a plurality of gears for each trailer guideway, said gear chain having a coupler head adapted to ride along said guideway, each of said guides on said container having at least one coupler head adapted to releasably engage said coupler head on said chain at an end of said guide beneath said container, the relatively narrow portion of said guideway being defined by opposed flanges adapted to maintain said chain against buckling whereby said chain can exert pushing effort on said container.

7. Freight transfer apparatus comprising a demountable container having a plurality of transversely extending guides secured therebeneath defining a pair of spaced parallel tracks and rack elements, a vehicle having a plurality of guideways adapted to receive said guides therein in mating relation, roller means in said guideways adapted to support said guides and said container for movement along said guideways, a flat car having a plurality of guideways of an inverted T-shaped configuration to receive the guides on said container therein in mating relationship, each of said guideways on said flat car having a plurality of rollers journalled therein for engaging said tracks to support said container for longitudinal movement in said guideways, a gear chain for each of said guideways adapted to be engaged by said gears having a coupler head adapted to ride along said guideway, each of said guides on said container having a coupler element releasably engaged by said coupler head on said chain, the relatively narrow portion of said guideway being defined by opposed flanges adapted to maintain said chain against buckling whereby said chain can exert pushing effort on said container, and a bridge pivotally secured on said vehicle at one end of each of its guideways and adapted to pivot into longitudinal alignment therewith in supported relation with said vehicle, said bridge having a guideway formed therein for guiding and supporting said guides of the guideways in said vehicle and said flat car, said flat car having a pair of bracket members at each side of the openings of each of its guideways and said bridge being contoured at the outer end thereof for locking engagement with said brackets when said bridge is pivoted downwardly thereon, whereby to maintain the guideways in said vehicle and said flat car in register for unimpeded movement of said container from said trailer bed to said flat car or from said flat car to said vehicle in response to force applied by said gears and said chain.

8. Freight transfer apparatus comprising a freight container having a plurality of parallel guides secured therebeneath, each of said guides comprising a pedestal having a head portion at the bottom provided with track and rack elements extending longitudinally thereof, a portion of the rack element being above the level of the track element, a vehicle having a plurality of guideways adapted to receive said guides therein in guided relationship, roller means in said guideways adapted to engage said head portion and to support said guides and container for movement along said guideways, means on said guideways for engaging said guides above said head portion to secure said guides against vertical movement, gear means in each guideway adapted to engage a rack element to move the container longitudinally of the guideways, a gear chain adapted to ride in each of said guideways engaged by said gear means for moving the gear chain longitudinally in the guideway, coupler means releasably interconnecting a guide and one end of a gear chain for moving the container longitudinally of the guideways.

9. Freight transfer apparatus comprising a freight container having a plurality of parallel guides secured therebeneath, each of said guides comprising a pedestal having a head portion at the bottom provided with track and rack elements extending longitudinally thereof, a portion of the rack element being above the level of the track element, a car having a plurality of guideways adapted to receive said guides therein in guided relationship for movement along said guideways, a vehicle having a plurality of parallel guideways adapted to receive said guides therein in guided relationship, roller means in said vehicle guideways adapted to engage said head portion and to support said guides and container for movement along said vehicle guideways, means on said car guideways for engaging said guides above said head portion to secure said guides against vertical movement, gear means in each vehicle guideway adapted to engage a rack element to move the container longitudinally of said car and vehicle guideways, a gear chain adapted to ride in each of said vehicle guideways engaged by said gear means for moving the gear chain longitudinally in said vehicle guideway, means for maintaining said gear chain in said vehicle guideways against buckling whereby said gear chain can exert pushing effort on said container, coupler means releasably interconnecting a guide and one end of a gear chain for moving the container longitudinally of the guideways.

References Cited in the file of this patent

UNITED STATES PATENTS

| | | |
|---|---|---|
| 1,426,408 | Pezzetti | Aug. 22, 1922 |
| 1,448,057 | Denehie | Mar. 13, 1923 |
| 1,451,127 | Thornton | Apr. 10, 1923 |
| 1,784,975 | Rosman | Dec. 16, 1930 |
| 2,127,481 | Fitch | Aug. 16, 1938 |
| 2,287,068 | Shonnard | June 23, 1942 |
| 2,516,881 | Jarvis | Aug. 1, 1950 |
| 2,691,450 | Rosenbaum | Oct. 12, 1954 |